C. H. HADDRELL.
CENTRIFUGAL SWITCH.
APPLICATION FILED MAY 14, 1910.

1,011,774.

Patented Dec. 12, 1911.

Witnesses:
Irving E. Steers
J. Ellis Glen

Inventor
Charles H. Haddrell,
by Albert G. Davis
His Attorney.

UNITED STATES PATENT OFFICE.

CHARLES H. HADDRELL, OF LYNN, MASSACHUSETTS, ASSIGNOR TO GENERAL ELECTRIC COMPANY, A CORPORATION OF NEW YORK.

CENTRIFUGAL SWITCH.

1,011,774.      Specification of Letters Patent.      Patented Dec. 12, 1911.

Application filed May 14, 1910. Serial No. 561,303.

*To all whom it may concern:*

Be it known that I, CHARLES H. HADDRELL, a subject of the King of Great Britain, residing at Lynn, county of Essex, State of Massachusetts, have invented certain new and useful Improvements in Centrifugal Switches, of which the following is a specification.

My invention relates to centrifugally operated switches for alternating current motors, and is particularly applicable to small single-phase induction motors of the type having a starting winding which is open circuited when the motor is up to speed. Such motors have been provided heretofore with two stationary collector rings concentric with the motor shaft and arranged side by side, and contacts carried by the rotor which bridge the collector rings at starting, but when the motor is up to speed are thrown away from the collector rings by centrifugal force.

My invention consists in a novel, simple and compact form of centrifugally actuated switch adapted for use in such a structure, and which necessitates the use of only one stationary collector ring. To this end, my invention comprises a stationary collector ring surrounding the motor shaft, a rotatable collector ring, a contact electrically connected to said rotatable collector ring adapted to normally engage said stationary collector ring and to be thrown away from said ring by centrifugal force when the motor is up to speed, and a brush in contact with said rotatable collector ring.

Other features of novelty which characterize my invention are pointed out with particularity in the claims annexed to and forming a part of this specification.

For a better understanding of my invention, reference may be had to the following description taken in connection with the accompanying drawing, in which—

Figure 1:
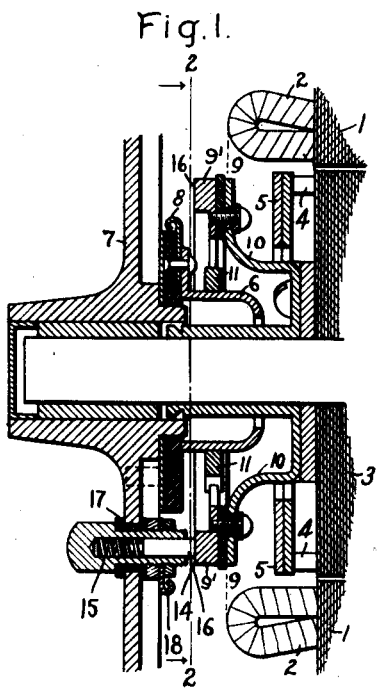
Figure 2:
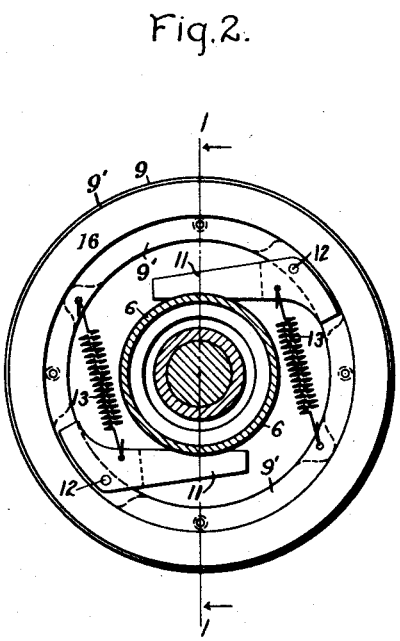

Figure 1 shows a sectional view, taken on the line 1—1 of Fig. 2, of a centrifugal switch arranged in accordance with my invention; Fig. 2 is a section on the line 2—2 of Fig. 1 looking in the direction of the arrows, and Fig. 3 is a diagram of connections.

In the drawing, 1 represents the laminations of the stator of an alternating current motor having a primary winding 2 arranged in slots in the laminations. The rotor 3, I have shown as being provided with a squirrel cage winding of well known construction, comprising conductors 4 and end rings 5. A stationary collector ring 6 is arranged so as to surround the motor shaft and is fastened to the motor frame 7, but insulated therefrom. The terminal 8 is electrically connected to the collector ring 6 and is arranged to receive a suitable lead from one end of the starting winding of the motor. A second collector ring is supported in any suitable manner from the rotor shaft. As shown, this rotatable collector ring is in the form of a disk 9 having an outer collecting portion 9′ surrounding and concentric with the stationary collector ring, an inner portion 10 secured to the rotor, and a sleeve portion surrounding the motor shaft and integral with the portion 10. The collecting portion is insulated in any suitable manner preferably by inserting an insulating member between the parts 9′ and 10 as clearly shown in the drawing. Contacts 11 are pivotally mounted on pins 12 fastened in the member 9, whereby the contacts 11 are electrically connected to this member. These contacts are pressed into engagement with the collector ring 6 by means of springs 13 during starting. A stationary brush 14, which may be of carbon, is pressed by means of the spring 15 into engagement with the surface 16 of the member 9. The brush and brush-holder are suitably supported by any portion of the frame of the motor and are insulated therefrom by means of a bushing 17. A terminal 18 is electrically and mechanically connected to the brush-holder and is designed to receive a lead from one side of an alternating current source of power.

Figure 3:
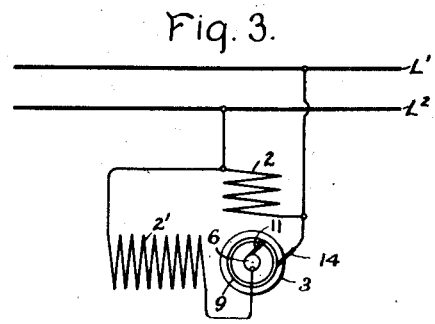

The circuit connections are shown in Fig. 3, in which $L'$ and $L^2$ represent the lines from a single phase alternating current source of power, 2 represents the main primary winding and 2′ the starting winding in series with which is the stationary collector ring 6 and the member 9 rotatable with the rotor 3. At starting the stationary collector ring is electrically connected to the member 9 by means of the contacts 11 so that the circuit of the starting winding is closed as the brush 14 is always in contact with the member 9. When the motor is up to speed the contacts 11 are thrown away from the collector ring by centrifugal force so as to open the circuit of the starting winding.

Although I have shown in Fig. 2 of the drawing two contacts for connecting the collector ring 6 to the member 9, it is evident that only one may be used, as is shown diagrammatically in Fig. 3, and I aim in the appended claims to cover such a modification as well as all other modifications which do not depart from the spirit and scope of my invention.

What I claim as new and desire to secure by Letters Patent of the United States, is,—

1. In combination with the rotor of an alternating current motor, a stationary collector ring surrounding the motor shaft, a rotatable collector ring, a contact electrically connected to said rotatable collector ring adapted to normally engage said stationary collector ring and to be thrown away from said ring by centrifugal force when the motor is up to speed, and a brush in contact with said rotatable collector ring.

2. In combination with the rotor of an alternating current motor, a stationary collector ring surrounding the motor shaft, a rotatable collector ring, a contact electrically connected to said rotatable collector ring adapted to normally engage said stationary collector ring and to be thrown away from said stationary collector ring by centrifugal force when the motor is up to speed, and a brush suitably supported by the frame of the motor and in contact with said rotatable collector ring.

3. In combination with the rotor of an alternating current motor, a stationary collector ring surrounding the motor shaft, a disk surrounding said collector ring and rotatable with said rotor, a contact electrically connected to said disk adapted to normally engage said collector ring and to be thrown away from said ring by centrifugal force when the motor is up to speed, and a brush in contact with said disk.

4. In combination with the rotor of an alternating current motor, a stationary collector ring surrounding the motor shaft, a disk carried by said rotor comprising an inner portion and an outer portion, said outer portion being in the form of a ring and insulated from said inner portion, a contact electrically connected to said outer portion adapted to normally engage said collector ring and to be thrown away from said ring by centrifugal force when the motor is up to speed, and a brush in contact with said disk.

5. In combination with the rotor of an alternating current motor, a stationary collector ring surrounding the motor shaft, a disk surrounding said collector ring and carried by said rotor, said disk comprising an inner portion and an outer portion, said outer portion being in the form of a ring and insulated from said inner portion, a contact electrically connected to said outer portion adapted to normally engage said collector ring and to be thrown away from said ring by centrifugal force when the motor is up to speed, and a brush in contact with said disk.

In witness whereof, I have hereunto set my hand this 12th day of May, 1910.

CHARLES H. HADDRELL.

Witnesses:
JOHN A. MCMANUS, Jr.,
CHARLES A. BARNARD.